(12) United States Patent
Ooga (10) Patent No.: US 10,539,434 B2
(45) Date of Patent: Jan. 21, 2020

(54) AIR FLOW RATE MEASUREMENT DEVICE

(71) Applicant: DENSO CORPORATION, Kariya, Aichi-pref. (JP)

(72) Inventor: Takashi Ooga, Kariya (JP)

(73) Assignee: DENSO CORPORATION, Kariya (JP)

( * ) Notice: Subject to any disclaimer, the term of this patent is extended or adjusted under 35 U.S.C. 154(b) by 174 days.

(21) Appl. No.: 15/572,641

(22) PCT Filed: May 19, 2016

(86) PCT No.: PCT/JP2016/002442
§ 371 (c)(1),
(2) Date: Nov. 8, 2017

(87) PCT Pub. No.: WO2016/189835
PCT Pub. Date: Dec. 1, 2016

(65) Prior Publication Data
US 2018/0136018 A1    May 17, 2018

(30) Foreign Application Priority Data
May 28, 2015    (JP) .................. 2015-108969

(51) Int. Cl.
*G01D 11/24* (2006.01)
*G01F 5/00* (2006.01)
*G01M 15/04* (2006.01)

(52) U.S. Cl.
CPC .............. *G01D 11/245* (2013.01); *G01F 5/00* (2013.01); *G01M 15/042* (2013.01)

(58) Field of Classification Search
CPC ......... G01D 11/245; G01F 1/684; G01F 5/00; G01M 15/042
See application file for complete search history.

(56) References Cited

U.S. PATENT DOCUMENTS 6,647,777 B1    11/2003   Kotaka et al.
2011/0271768 A1*  11/2011  Mizutani ............... G01F 1/6965
                                                        73/861.08

(Continued)

FOREIGN PATENT DOCUMENTS

| JP | 11-326002 | 11/1999 |
| JP | 4196546 | 12/2008 |
| JP | 2014-16188 | 1/2014 |

*Primary Examiner* — Justin Seo
*Assistant Examiner* — John M Royston
(74) *Attorney, Agent, or Firm* — Nixon & Vanderhye P.C.

(57) ABSTRACT

An air flow rate measurement device includes a housing that includes a bypass flow channel, which branches from a main flow channel and then returns to the main flow channel, a flow rate sensor assy that incorporates a flow rate sensor element, which measures a flow rate of air flowing through the bypass flow channel, and a physical quantity sensor assy that incorporates a physical quantity sensor element, which measures a physical quantity of air flowing through the main flow channel. The housing includes a first mount part on which the flow rate sensor assy is mounted, and a second mount part on which the physical quantity sensor assy is mounted. The flow rate sensor assy and the physical quantity sensor assy are attached to the housing from the same direction to be mounted on the first mount part and the second mount part respectively.

3 Claims, 12 Drawing Sheets

(56) References Cited

U.S. PATENT DOCUMENTS

| | | | |
|---|---|---|---|
| 2012/0198925 A1* | 8/2012 | Saito | F02D 41/187 73/114.33 |
| 2013/0036806 A1 | 2/2013 | Kohno | |
| 2015/0377676 A1 | 12/2015 | Asano et al. | |

* cited by examiner

AIR FLOW RATE MEASUREMENT DEVICE

CROSS REFERENCE TO RELATED APPLICATION

This application is the U.S. national phase of International Application No. PCT/JP2016/002442 filed 19 May 2016, which designated the U.S. and claims priority to Japanese Patent Application No. 2015-108969 filed on May 28, 2015, the entire contents of each of which are hereby incorporated herein by reference.

TECHNICAL FIELD

The present disclosure relates to an air flow rate measurement device to measure a volume of air inspired into an engine of an automobile or the like.

BACKGROUND ART

An air flow rate measurement device to measure an inhaled air volume of an engine, to which a temperature sensor is attached, has heretofore been known. For example, an air flow rate measurement device described in Patent Document 1 has a temperature sensor to detect an air temperature outside a chassis including a flow rate sensor. A thermistor is used as the temperature sensor for example and two lead wires of the thermistor are extracted toward the side of a cover through a through-hole formed at a mount part of a chassis and electrically connected to terminals inserted into the cover. Here, the cover is secondarily formed over the mount part of the chassis.

PRIOR ART DOCUMENT

Patent Document

Patent Document 1: JP2014-16188A

Meanwhile, in the air flow rate measurement device according to Patent Document 1, the direction of assembling the flow rate sensor over the chassis is different from the direction of assembling the temperature sensor over the chassis. That is, whereas the flow rate sensor is assembled to a mount part from the side of the cover, the temperature sensor is assembled to a mount part from the other side of the cover. The configuration: requires more complicated assembly equipment in comparison with the case of assembling a flow rate sensor and a temperature sensor from an identical direction; and hence causes a cost to increase. Further, after the lead wires of the temperature sensor go through a through-hole, the through-hole is filled with a silicon-type seal material in order to plug the through-hole. The seal material cannot withstand a molding pressure when the cover is secondarily formed however and the seal material may undesirably be exposed to the outside (the other side of the cover) of the through-hole. For that reason, an epoxy resin is applied over the seal material as a means for preventing the seal material from being exposed. On this occasion, the increase of cost accompanying the increase of manufacturing processes is a problem. Moreover, the configuration of Patent Document 1 cannot easily cope with variations other than a sensor having lead wires. For example, when a sensor of an assy structure formed by integrating a sensor element and a circuit part with a resin mold is mounted, an attachment structure conforming to the assy shape is required and hence a configuration of passing a lead wire through a through-hole formed at a mount part cannot conform to a sensor of an assy structure.

SUMMARY OF INVENTION

The present disclosure addresses the above issues. Thus, it is an objective of the present disclosure to provide an air flow rate measurement device that can simplify a manufacturing process and easily cope with the variation of a mounted sensor.

To achieve the objective of the present disclosure, an air flow rate measurement device in an aspect of the present disclosure includes a housing that includes a bypass flow channel, which branches from a main flow channel and then returns to the main flow channel, a flow rate sensor assy that incorporates a flow rate sensor element, which measures a flow rate of air flowing through the bypass flow channel, and a physical quantity sensor assy that incorporates a physical quantity sensor element, which measures a physical quantity of air flowing through the main flow channel. The housing includes a first mount part on which the flow rate sensor assy is mounted, and a second mount part on which the physical quantity sensor assy is mounted. The flow rate sensor assy and the physical quantity sensor assy are attached to the housing from the same direction to be mounted on the first mount part and the second mount part respectively.

According to the above configuration, a flow rate sensor assy and a physical quantity sensor assy can be assembled and mounted from an identical direction over a first mount part and a second mount part disposed in a housing. That is, the physical quantity sensor assy has an assy structure similar to the flow rate sensor assy unlike a temperature sensor having lead wires connected to both the ends of a thermistor disclosed in Patent Document 1. Consequently, the direction of mounting the flow rate sensor assy over the first mount part and the direction of mounting the physical quantity sensor assy over the second mount part can be identical. As a result, assembly equipment can be simplified and cost can be reduced in comparison with Patent Document 1 in which the assembly directions of a flow rate sensor and a temperature sensor are different from each other.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

The present disclosure is explained in detail through the following embodiments.

(First Embodiment)

Figure 4:
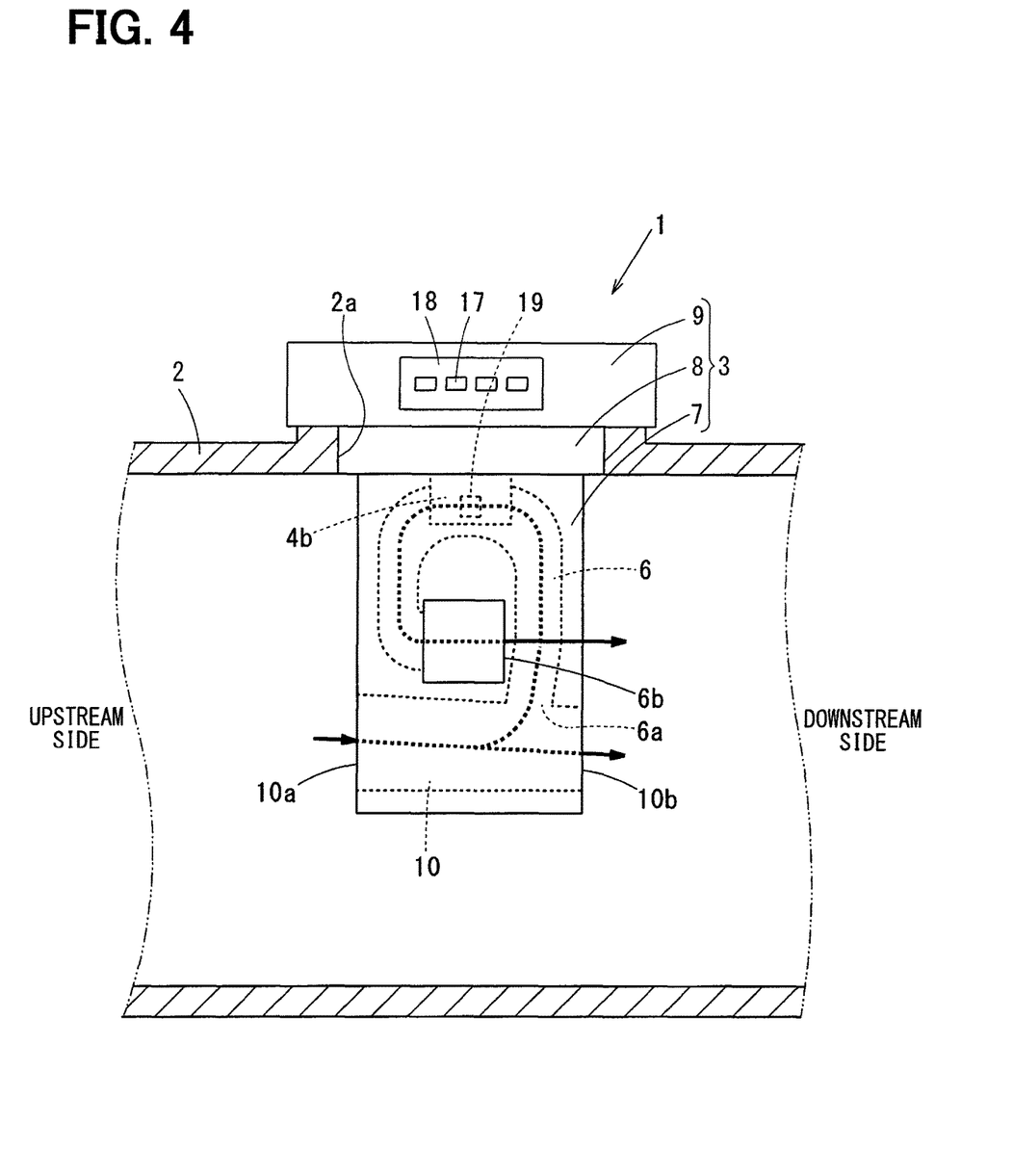
FIG. 4 is a longitudinal sectional view showing a state of attaching an air flow rate measurement device according to the first embodiment to an air intake duct.

In a first embodiment, an example of an air flow rate measurement device 1 to measure the volume of air inspired into an engine of an automobile is explained. The air flow rate measurement device 1, as shown in FIG. 4, includes: a housing 3 attached to an air intake duct 2 of an engine; and a flow rate sensor assy 4 (refer to FIG. 1) and a physical quantity sensor assy 5 (refer to FIG. 1) which are incorporated into the housing 3. The air intake duct 2 is disposed between an air cleaner and a throttle valve for example and forms a main flow channel. The housing 3 includes a bypass body 7 to form a bypass flow channel 6, a mount part 8 over which the flow rate sensor assy 4 and the physical quantity sensor assy 5 are mounted, and a cover 9 formed secondarily over the mount part 8.

Figure 5:
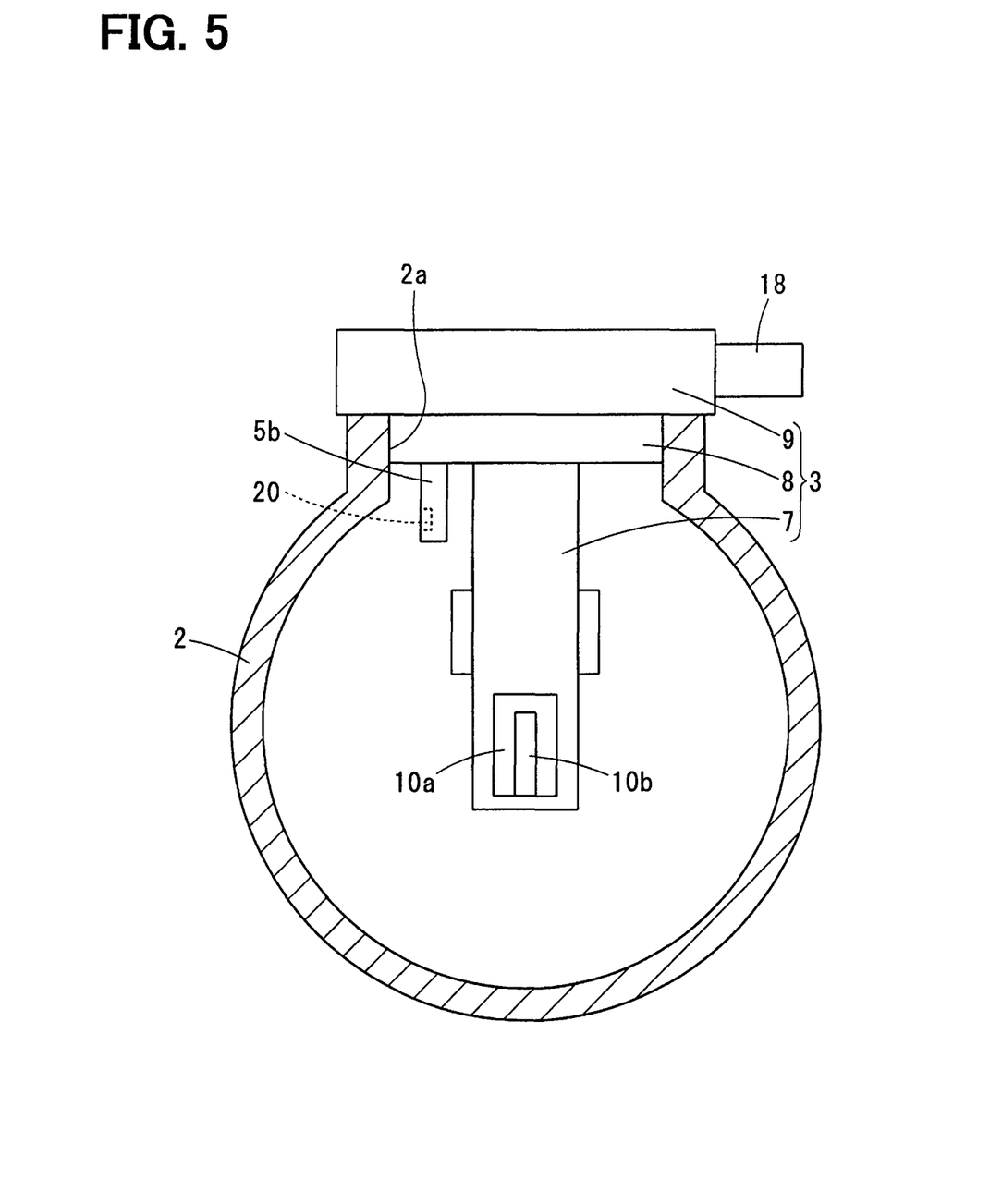
FIG. 5 is a transverse sectional view showing a state of attaching the air flow rate measurement device according to the first embodiment to the air intake duct.

The bypass body 7 is inserted into the interior of the air intake duct 2 through a mounting hole 2a opening in the peripheral wall of the air intake duct 2 as shown in FIGS. 4 and 5. In the bypass body 7, a main flow channel 10 to take in a part of the air flowing in the air intake duct 2 and a bypass flow channel 6 to take in a part of the air flowing in the main flow channel 10 are formed. The main flow channel 10 is communicably formed nearly linearly between an entrance 10a opening toward the upstream side (left side in FIG. 4) of the air intake duct 2 and an exit 10b opening toward the downstream side of the air intake duct 2. The bypass flow channel 6 is communicably formed between a bypass entrance 6a of a bypass branching in the middle of the main flow channel 10 and a bypass exit 6b opening in both the side faces of the bypass body 7. The bypass flow channel 6 has large bend parts in the middle of the flow channel and is formed so as to be longer than the main flow channel 10. Here, the arrows described in FIG. 4 represent the flow of air.

Figure 1:
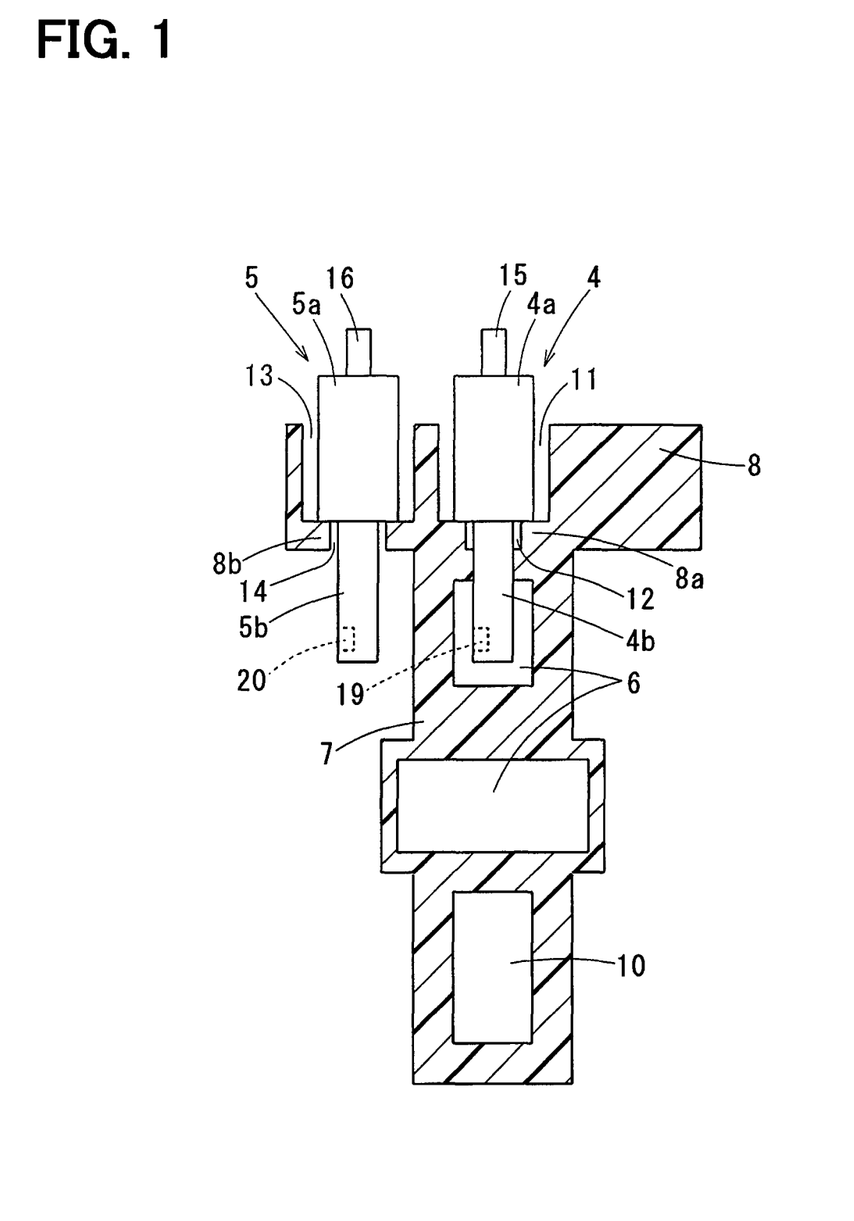
FIG. 1 is a sectional view showing a state of mounting a flow rate sensor assy and a physical quantity sensor assy over a mount part according to a first embodiment.
Figure 2:
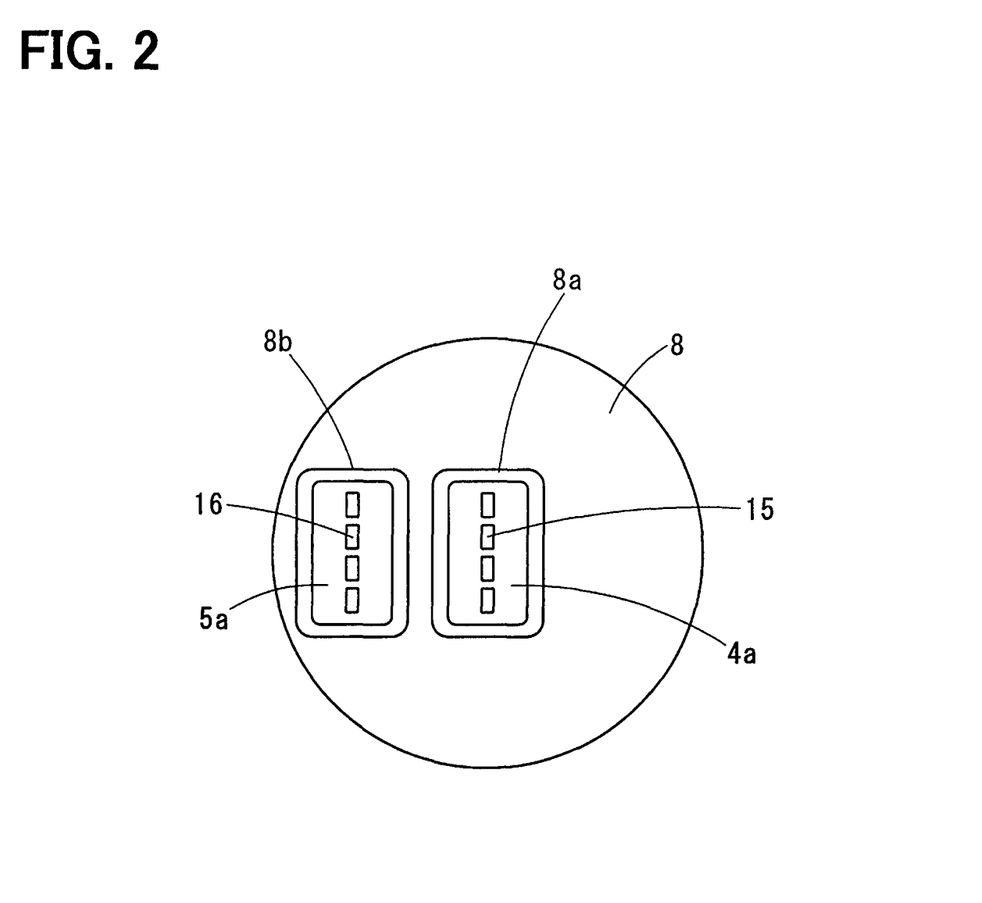
FIG. 2 is a plan view showing a state of mounting the flow rate sensor assy and the physical quantity sensor assy over the mount part according to the first embodiment.
Figure 3:
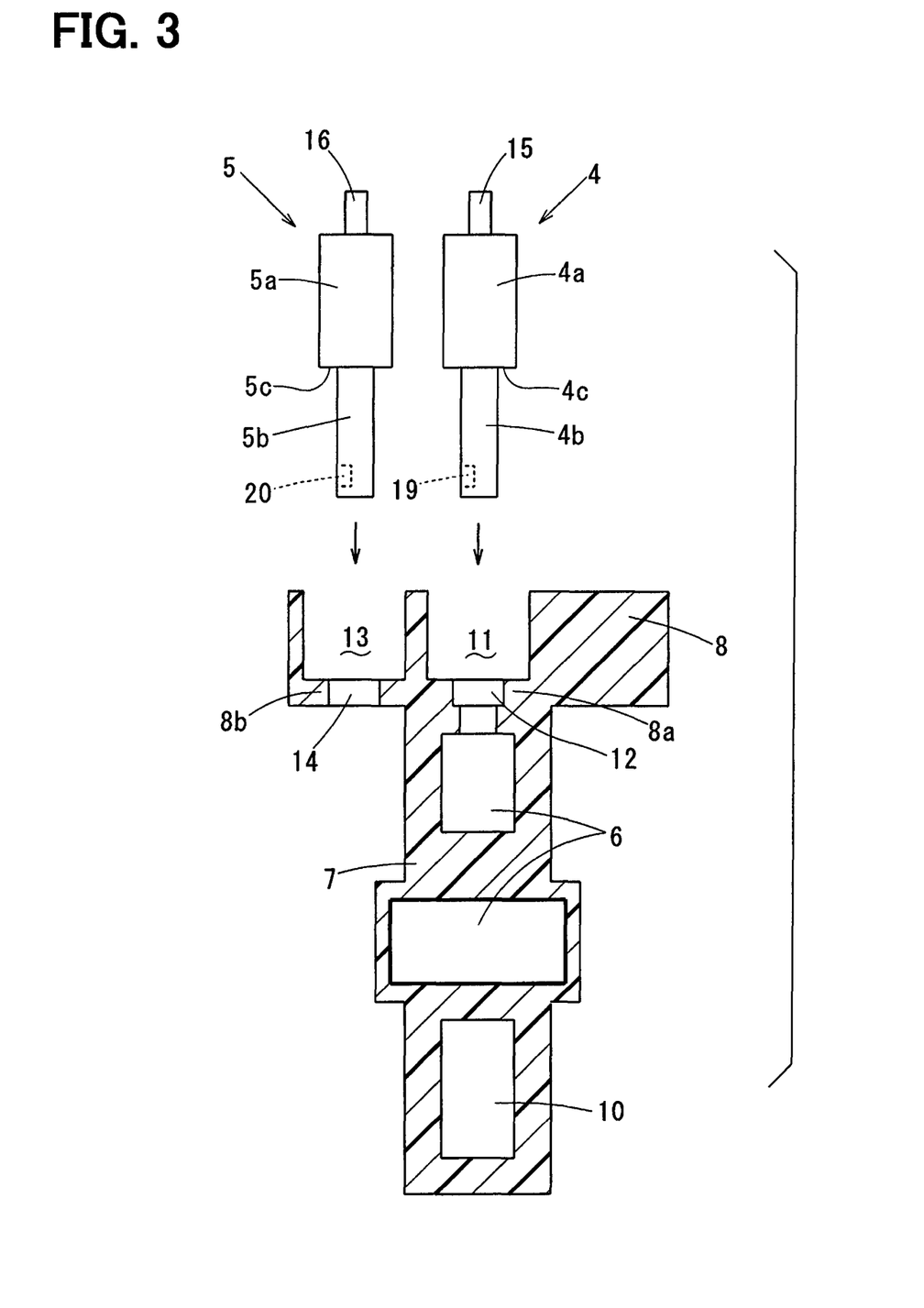
FIG. 3 is a sectional view showing a process of mounting the flow rate sensor assy and the physical quantity sensor assy over the mount part according to the first embodiment.

The mount part 8, for example, is formed integrally with the bypass body 7 and fits airtightly with the mounting hole 2a in the air intake duct 2 with a seal part such as an O-ring (not shown in the figures) interposed. In the mount part 8, a first mount part 8a over which the flow rate sensor assy 4 is mounted and a second mount part 8b over which the physical quantity sensor assy 5 is mounted are formed as shown in FIGS. 1 to 3. The first mount part 8a is formed nearly in the center of the mount part 8 (refer to FIG. 2) and, as shown in FIG. 3, has a first sensor mount room 11 having an opening on the upper side and a bottom surface on the lower side in the figure and a first sensor insertion hole 12 opening at the bottom surface of the first sensor mount room 11 and communicating with the bypass flow channel 6. The second mount part 8b is formed adjacently to the first mount part 8a (refer to FIG. 2) and, as shown in FIG. 3, has a second sensor mount room 13 having an opening on the upper side and a bottom surface on the lower side in the figure and a second sensor insertion hole 14 opening at the bottom surface of the second sensor mount room 13 and communicating with the outside of the bypass body 7.

The cover 9 is formed secondarily in the state of mounting the flow rate sensor assy 4 and the physical quantity sensor assy 5 over the first mount part 8a and the second mount part 8b and airtightly covers the first sensor mount room 11 and the second sensor mount room 13. A terminal 17 (refer to FIG. 4) connected electrically to a terminal 15 of the flow rate sensor assy 4 and a terminal 16 of the physical quantity sensor assy 5 is inserted into the cover 9 and an end of the terminal 17 protrudes into the interior of a connector housing 18. The connector housing 18 is formed integrally with the cover 9 with a resin. At the terminal 17, a power-supply terminal and a GND terminal common to the flow rate sensor assy 4 and the physical quantity sensor assy 5, an output terminal of outputting measurement information of the flow rate sensor assy 4 and the physical quantity sensor assy 5 as electric signals, and others are formed for example.

The flow rate sensor assy 4 includes a flow rate sensor element 19 to measure a flow rate of air (inspired air volume), a sensor circuit part (not shown in the figures) to amplify and digitally convert an output of the flow rate sensor element 19, and a mold case (explained below) including those. The mold case has a flow rate sensor chassis part 4a on an end side of which the terminal 15 is extracted and a flow rate sensor support part 4b being formed on the other side of the flow rate sensor chassis part 4a and supporting the flow rate sensor element 19 as shown in FIG. 3. The physical quantity sensor assy 5 includes a physical quantity sensor element 20 to measure a physical quantity of air, a sensor circuit part (not shown in the figures) to amplify and digitally convert an output of the physical quantity sensor element 20, and a mold case (explained below) including those. Here, a physical quantity of air means a humidity, a temperature, a pressure, or the like of air for example. The mold case has a physical quantity sensor chassis part 5a on one end side of which the terminal 16 is extracted and a physical quantity sensor support part 5b being formed on the other side of the physical quantity sensor chassis part 5a and supporting the physical quantity sensor element 20 as shown in FIG. 3.

The flow rate sensor assy 4 and the physical quantity sensor assy 5 are assembled from an identical direction relative to the housing 3 and mounted over the first mount part 8a and the second mount part 8b respectively as shown in FIG. 3. In the flow rate sensor assy 4, the flow rate sensor support part 4b is inserted into the first sensor insertion hole 12 and the flow rate sensor chassis part 4a is disposed in the first sensor mount room 11. Further, the mold case of the flow rate sensor assy 4 is formed so that the external dimension of the flow rate sensor chassis part 4a may be larger than the hole diameter of the first sensor insertion hole 12 and has a step 4c at the boundary between the flow rate sensor chassis part 4a and the flow rate sensor support part 4b. That is, the flow rate sensor chassis part 4a is disposed in the first sensor mount room 11 in the state of abutting on the step 4c to the opening periphery of the first sensor insertion hole 12 opening at the bottom surface of the first sensor mount room 11. Further, in the flow rate sensor support part 4b, a tip part where the flow rate sensor element 19 is disposed passes through the first sensor insertion hole 12 and is exposed to the bypass flow channel 6 and the flow rate sensor element 19 is exposed to the air flowing in the bypass flow channel 6 as shown in FIG. 1.

In the physical quantity sensor assy 5, the physical quantity sensor support part 5b is inserted into the second sensor insertion hole 14 and the physical quantity sensor chassis part 5a is disposed in the second sensor mount room 13. Further, the mold case of the physical quantity sensor assy 5 is formed so that the external dimension of the physical quantity sensor chassis part 5a is larger than the hole diameter of the second sensor insertion hole 14 and has a step 5c at the boundary between the physical quantity sensor chassis part 5a and the physical quantity sensor support part 5b. That is, the physical quantity sensor chassis part 5a is disposed in the second sensor mount room 13 in the state of abutting on the step 5c to the opening periphery of the second sensor insertion hole 14 opening at the bottom surface of the second sensor mount room 13. Further, in the physical quantity sensor support part 5b, a tip part where the physical quantity sensor element 20 is disposed passes through the second sensor insertion hole 14 and is exposed to the outside of the bypass body 7 and the physical quantity sensor element 20 is exposed to the air flowing in the interior of the air intake duct 2 as shown in FIG. 1.

The functions and effects of the first embodiment are described hereunder. 1) The air flow rate measurement device 1 according to the first embodiment can assemble and mount the flow rate sensor assy 4 and the physical quantity sensor assy 5 from an identical direction over the first mount part 8a and the second mount part 8b formed in the housing 3. That is, the physical quantity sensor assy 5 has an assy structure similar to the flow rate sensor assy 4 unlike a temperature sensor in which lead wires are connected to both the ends of a thermistor disclosed in Patent Document 1. Consequently, the direction of mounting the flow rate sensor assy 4 over the first mount part 8a and the direction of mounting the physical quantity sensor assy 5 over the second mount part 8b can be identical. As a result, assembly equipment can be simplified and cost can be reduced in comparison with Patent Document 1 in which the assembly directions of a flow rate sensor and the temperature sensor are different from each other.

2) The physical quantity sensor assy 5 has an assy structure of including the physical quantity sensor element 20 and the sensor circuit part in the mold case and hence can easily conform to the variation of a humidity sensor, a temperature sensor, a pressure sensor, or the like for example. That is, by standardizing the shapes of the physical quantity sensor chassis part 5a and the physical quantity sensor support part 5b, the physical quantity sensor assy 5 of a different measurement object can be mounted without changing the configuration of the second mount part 8b. 3) Both the flow rate sensor assy 4 and the physical quantity sensor assy 5 have sensor circuit parts and can use an identical power-supply voltage. As a result, it is possible to reduce the number of the terminals 17 by uniformalizing power-supply terminals and GND terminals.

4) When the cover 9 is secondarily formed over the mount part 8, the flow rate sensor chassis part 4a and the physical quantity sensor chassis part 5a can be molded simultaneously. That is, if a cover 9 is secondarily formed separately, a resin interface is formed between the cover 9 to mold the flow rate sensor chassis part 4a and the cover 9 to mold the physical quantity sensor chassis part 5a and hence sealability is a problem. In contrast, according to the configuration of molding the flow rate sensor chassis part 4a and the physical quantity sensor chassis part 5a simultaneously with a single cover 9, a resin interface is not formed and a good sealability can be secured.

Other embodiments are explained hereunder. Here, parts and configurations common to the first embodiment are represented by reference signs identical to the first embodiment and detailed explanations are omitted.

(Second Embodiment)

Figure 6:
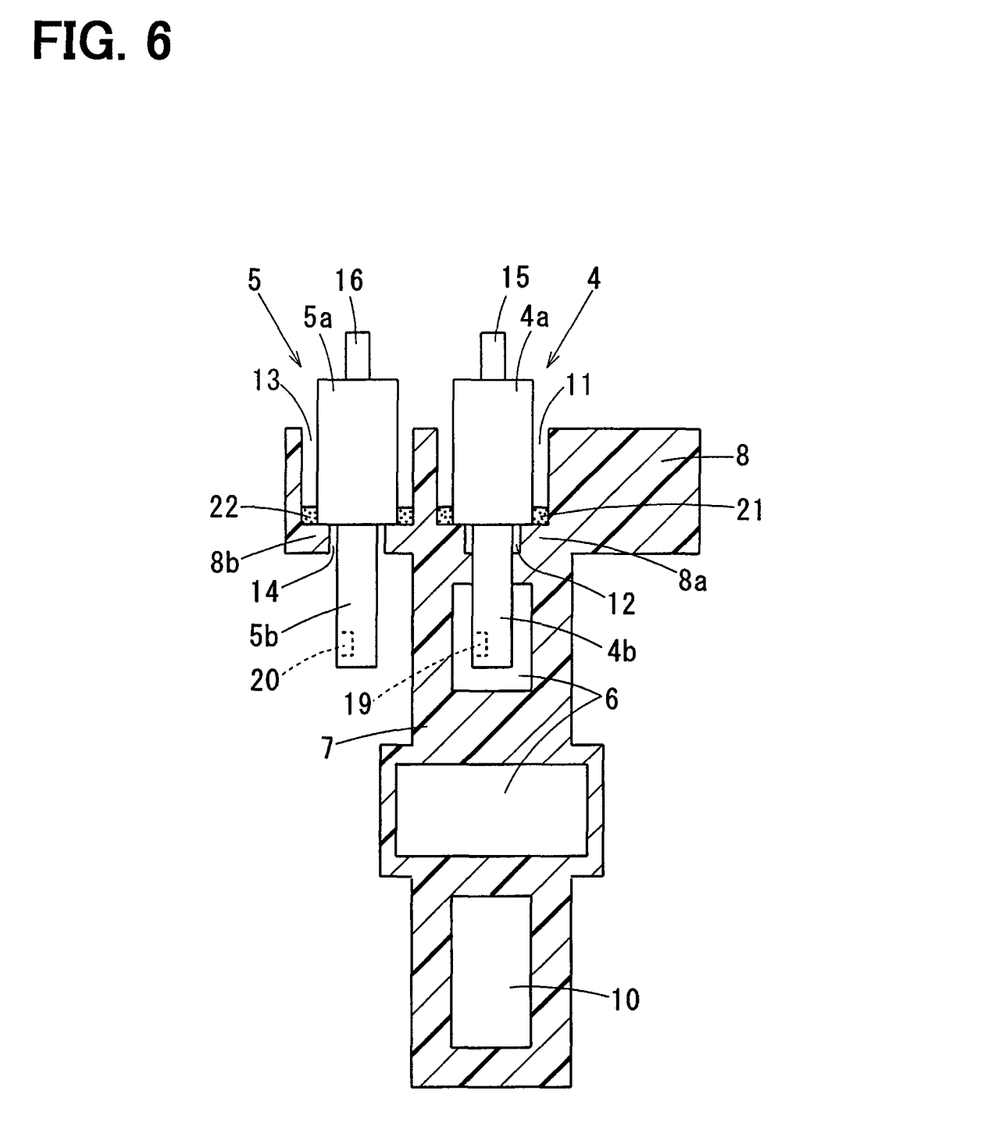
FIG. 6 is a sectional view showing a state of mounting a flow rate sensor assy and a physical quantity sensor assy over a mount part according to a second embodiment.
Figure 7:
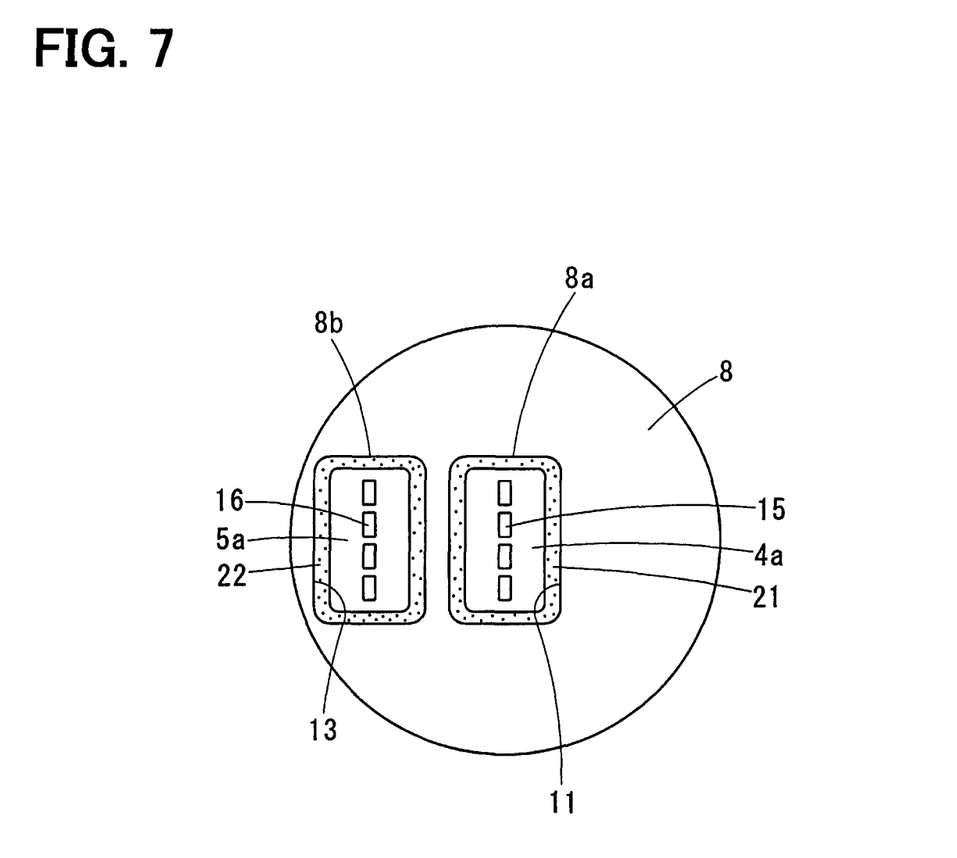
FIG. 7 is a plan view showing a state of mounting the flow rate sensor assy and the physical quantity sensor assy over the mount part according to the second embodiment.

A second embodiment is a case of disposing a first seal material 21 and a second seal material 22 around a flow rate sensor chassis part 4a and a physical quantity sensor chassis part 5a, respectively. The first seal material 21 is applied to an annular gap formed between the outer circumference of the flow rate sensor chassis part 4a and the inner circumference of a first sensor mount room 11 over the bottom surface of the first sensor mount room 11 as shown in FIGS. 6 and 7. A space between the first sensor mount room 11 and a first sensor insertion hole 12 is sealed airtightly by the first seal material 21. The second seal material 22 is applied to an annular gap formed between the outer circumference of the physical quantity sensor chassis part 5a and the inner circumference of a second sensor mount room 13 over the bottom surface of the second sensor mount room 13 as shown in FIGS. 6 and 7. A space between the sensor mount room 13 and a second sensor insertion hole 14 is sealed airtightly by the second seal material 22.

A flow rate sensor assy 4 is mounted over a first mount part 8a in the state of abutting on a step 4c (refer to FIG. 3) to the opening periphery of a first sensor insertion hole 12 opening at the bottom surface of a first sensor mount room 11. Likewise, a physical quantity sensor assy 5 is mounted over a second mount part 8b in the state of abutting on a step 5c (refer to FIG. 3) to the opening periphery of a second sensor insertion hole 14 opening at the bottom surface of the second sensor mount room 13. Consequently, when a cover 9 (refer to FIG. 4) is formed secondarily over a mount part 8, the first seal material 21 and the second seal material 22 are not pushed out toward the first sensor insertion hole 12 and the second sensor insertion hole 14 respectively. As a result, the surfaces of the first seal material 21 and the second seal material 22 are not required to be covered with an epoxy resin or the like and hence cost can be reduced by abolishing a process of applying an epoxy resin and simplifying a manufacturing process.

(Third Embodiment)

Figure 8:
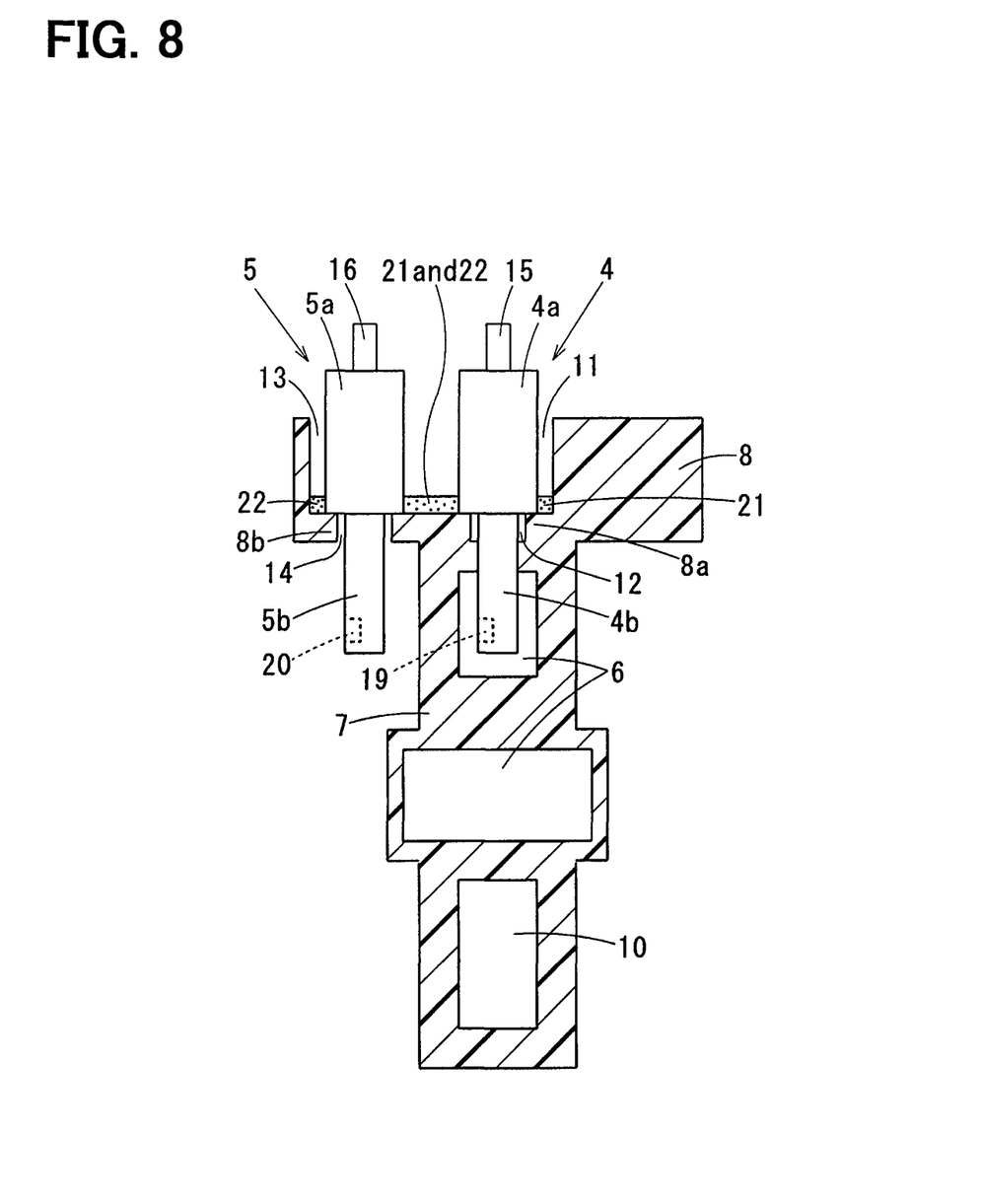
FIG. 8 is a sectional view showing a state of mounting a flow rate sensor assy and a physical quantity sensor assy over a mount part according to a third embodiment.
Figure 9:
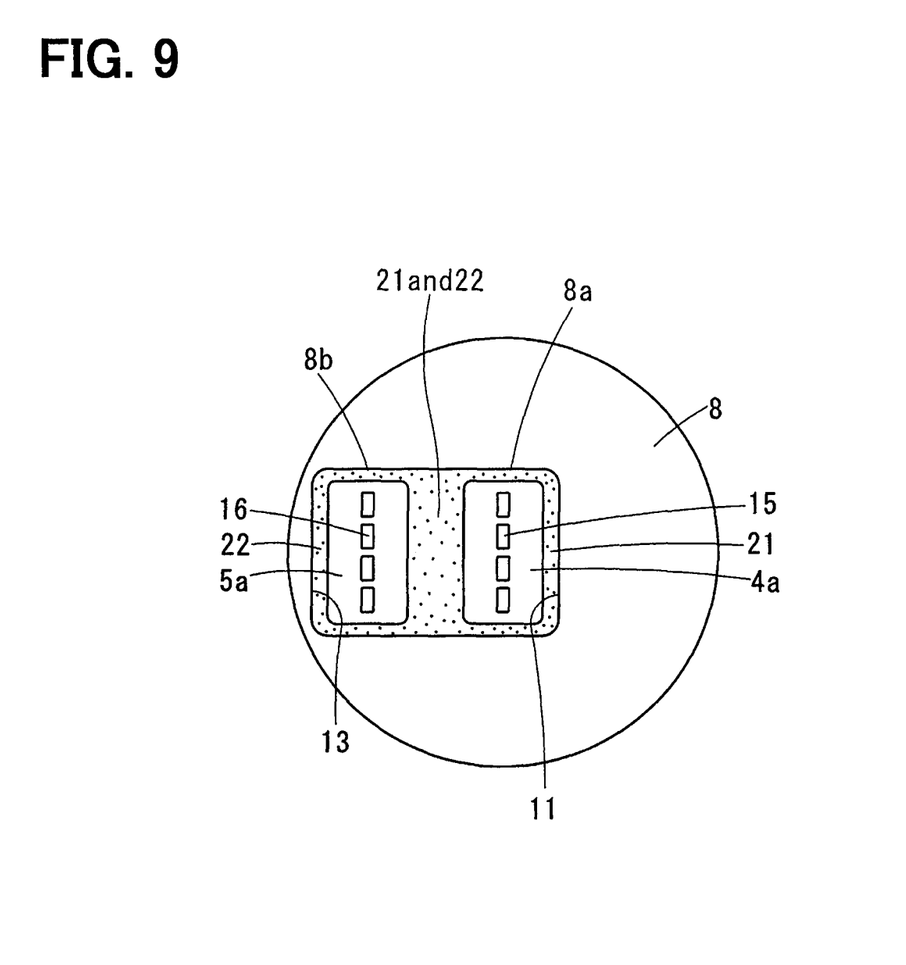
FIG. 9 is a plan view showing a state of mounting the flow rate sensor assy and the physical quantity sensor assy over a mount part according to the third embodiment.

A third embodiment is a case of partially sharing the first seal material 21 and the second seal material 22 described in the second embodiment. A first mount part 8a and a second mount part 8b are formed so that a first sensor mount room 11 and a second sensor mount room 13 may be integrated into one sensor mount room not having a boundary between them as shown in FIG. 8. As a result, the first seal material 21 and the second seal material 22 share the part applied between a flow rate sensor chassis part 4a and a physical quantity sensor chassis part 5a as shown in FIG. 9. In other words, the first seal material 21 and the second seal material 22 can be ejected through one nozzle (not shown in the figures) and hence the process of applying the seal material can be simplified.

(Fourth Embodiment)

Figure 10:
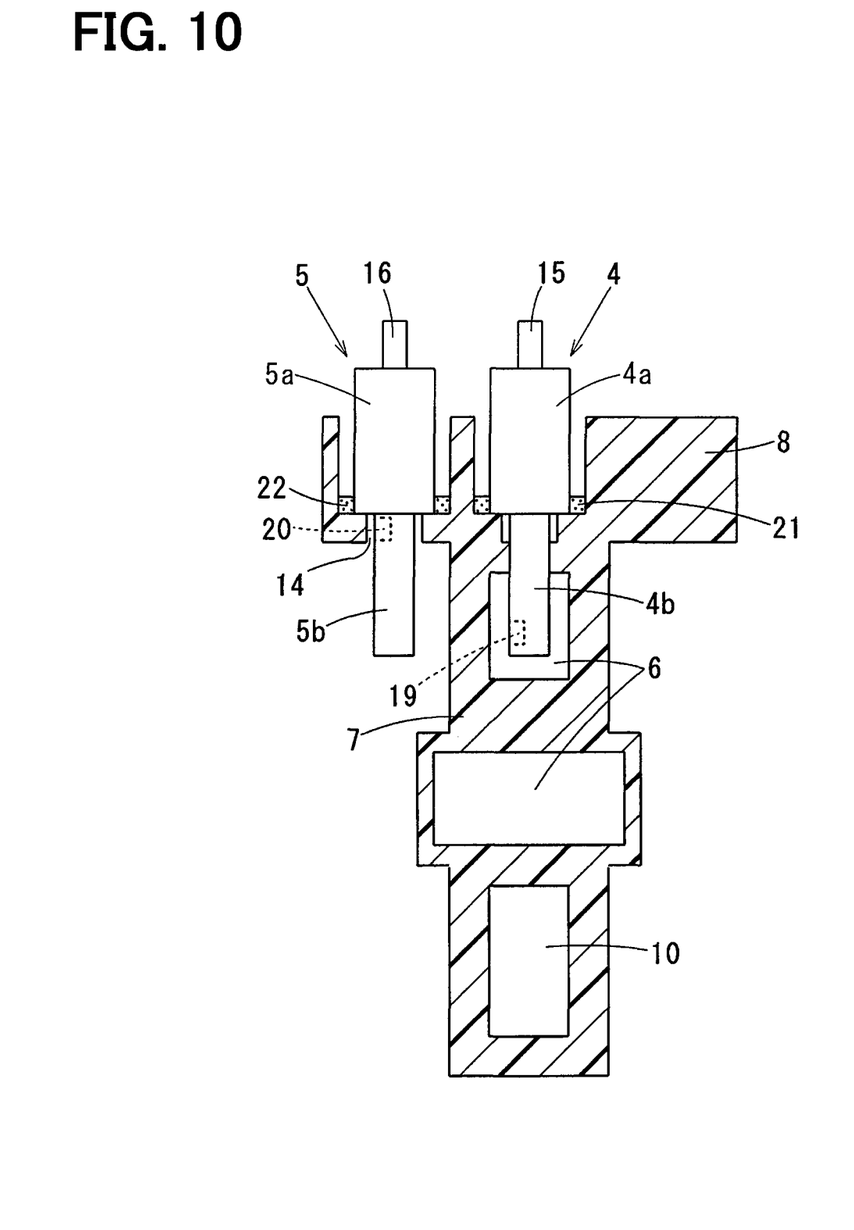
FIG. 10 is a sectional view showing a state of mounting a flow rate sensor assy and a physical quantity sensor assy over a mount part according to a fourth embodiment.

A fourth embodiment is a case of using a pressure sensor element 20 as a physical quantity sensor element. The pressure sensor element 20 is disposed not at the tip part of a physical quantity sensor support part 5b but at a site where the influence of a dynamic pressure in an air intake duct 2 (refer to FIG. 4) can be avoided. Specifically, as shown in FIG. 10, the pressure sensor element 20 is disposed at a position of lapping over a second sensor insertion hole 14 in the axial directions of the second sensor insertion hole 14, in other words, between the opening on one side and the opening on the other side of the second sensor insertion hole 14. According to the configuration, the influence of a dynamic pressure in the air intake duct 2 on the pressure sensor element 20 can be avoided and hence a pressure of air flowing in the air intake duct 2 can be measured accurately.

(Fifth Embodiment)

Figure 11:
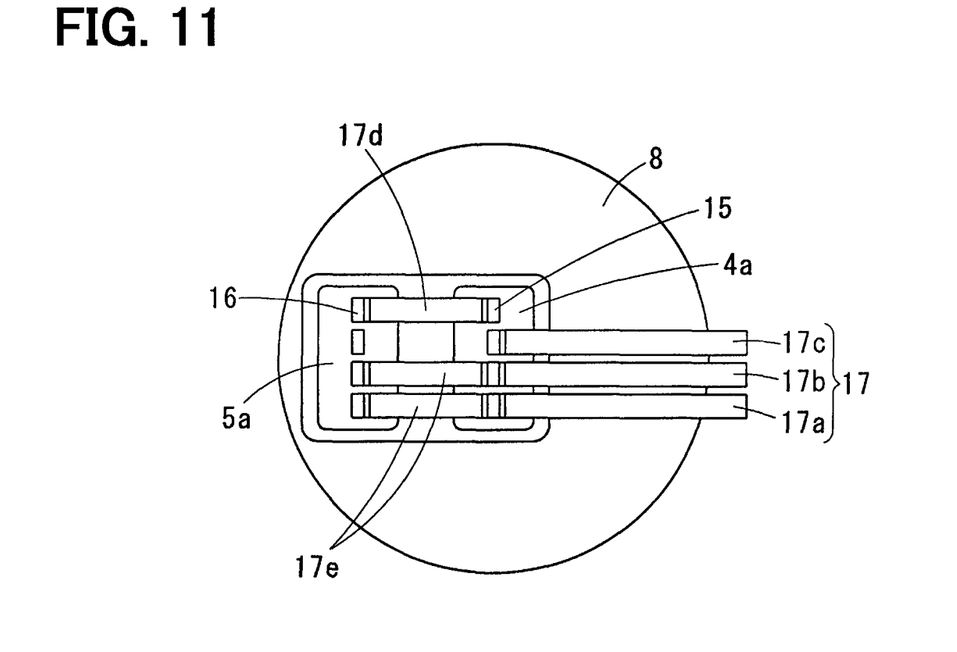
FIG. 11 is a plan view showing a state of connecting the terminals of a flow rate sensor assy and a physical quantity sensor assy to terminals with wires according to a fifth embodiment.

A fifth embodiment is a case of integrating output terminals into a single terminal. A sensor circuit part of a flow rate sensor assy 4 or a sensor circuit part of a physical quantity sensor assy 5 includes a signal processing circuit (not shown in the figure) to produce a multiple signal by digitally converting and multiplying an output of a flow rate sensor element 19 and an output of a physical quantity sensor element 20. A terminal 17 inserted into a cover 9 (refer to FIG. 4) includes a power-supply terminal 17a and a GND terminal 17b, which are shared by a flow rate sensor assy 4 and a physical quantity sensor assy 5, and an output terminal 17c to output a multiple signal produced in the above mentioned signal processing circuit, as shown in FIG. 11 for example. By a configuration according to the fifth embodiment, a power-supply terminal 17a, a GND terminal 17b, and an output terminal 17c are shared respectively and thus the number of the terminals can be reduced.

Figure 12:
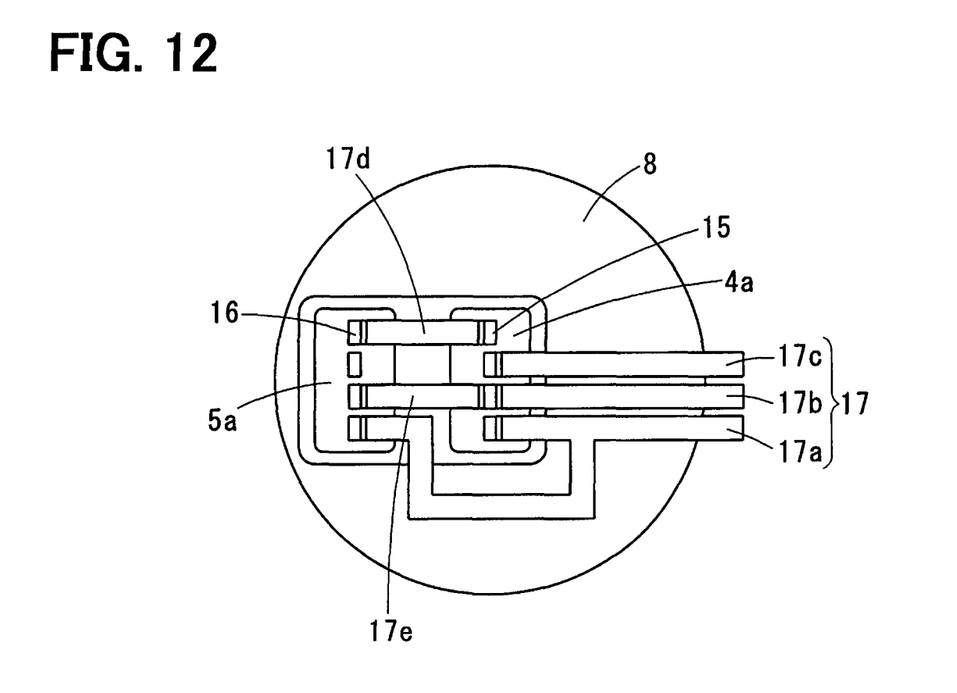
FIG. 12 is a plan view showing a state of connecting the terminals of the flow rate sensor assy and the physical quantity sensor assy to terminals with wires according to the fifth embodiment.

Here, although the case shown in FIG. 11 is a configuration of inputting an output of the physical quantity sensor assy 5 into a sensor circuit of the flow rate sensor assy 4 via a conductive member 17d, a configuration of inputting an output of the flow rate sensor assy 4 into a sensor circuit of the physical quantity sensor assy 5 is also acceptable. Further, although a terminal 15 of the flow rate sensor assy 4 is connected to a terminal 16 of the physical quantity sensor assy 5 by way of a conductive material 17e when the power-supply terminal 17a and the GND terminal 17b are shared in the case of FIG. 11, a configuration of branching the power-supply terminal 17a and connecting the branches to the terminal 15 of the flow rate sensor assy 4 and the terminal 16 of the physical quantity sensor assy 5 as shown in FIG. 12 for example is also acceptable.

(Sixth Embodiment)

Figure 13:
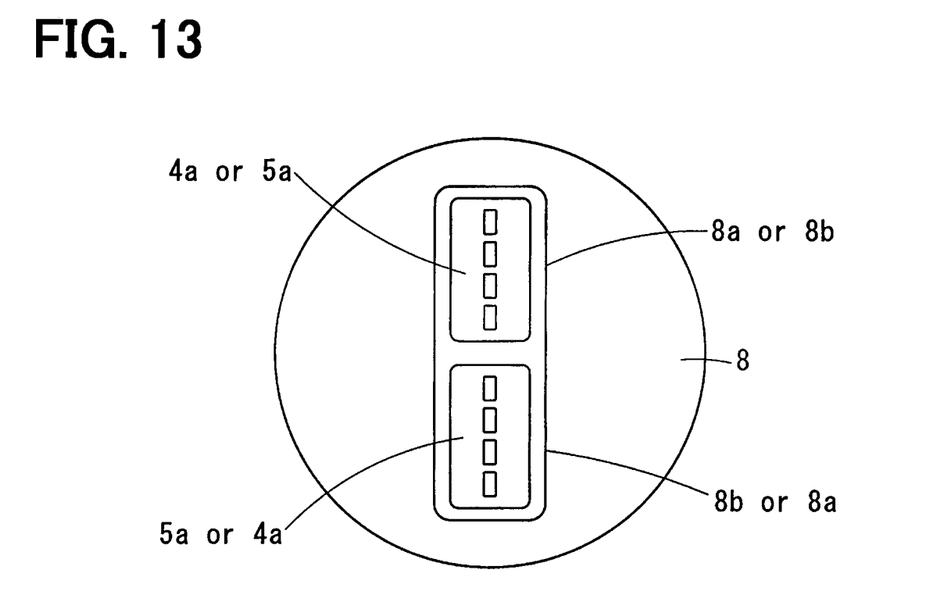
FIG. 13 is a plan view showing a state of mounting a flow rate sensor assy and a physical quantity sensor assy over a mount part according to a sixth embodiment.
Figure 14:
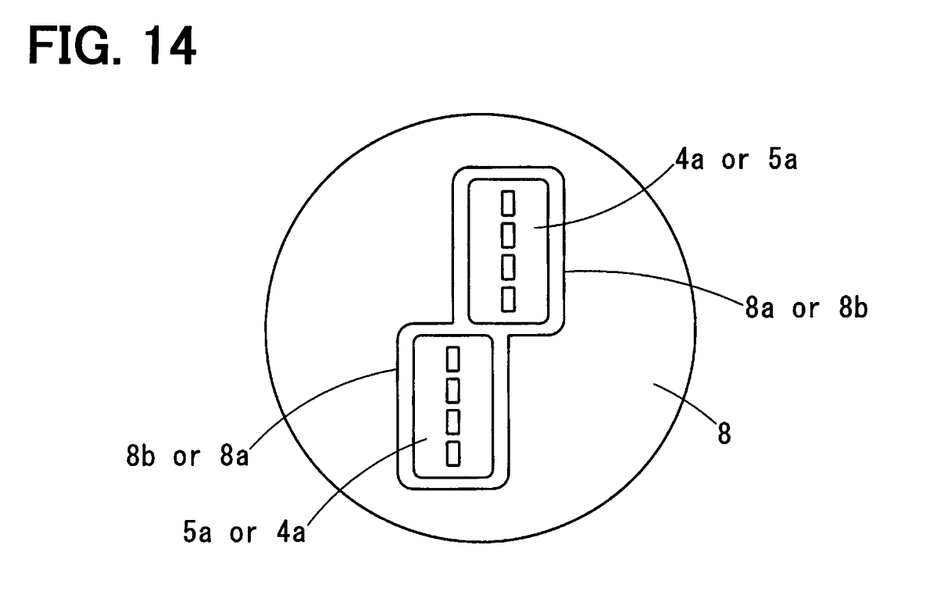
FIG. 14 is a plan view showing a state of mounting the flow rate sensor assy and the physical quantity sensor assy over the mount part according to the sixth embodiment.

A sixth embodiment is a case of changing the positions of a first mount part 8a and a second mount part 8b. Although an example of disposing the first mount part 8a nearly in the center of the mount part 8 is described in the first embodiment, the positions of the first mount part 8a and the second mount part 8b can be changed appropriately as shown in FIG. 13 or FIG. 14 for example.

A modification of the above embodiments is described hereunder. As a physical quantity sensor assy 5 according to the present disclosure, for example not only a humidity sensor, a temperature sensor, a pressure sensor, or the like is used independently but also a combination of sensors for different measurement objects can be used.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. An air flow rate measurement device comprising:
a housing that includes a bypass flow channel, which branches from a main flow channel and then returns to the main flow channel;
a flow rate sensor assy that incorporates a flow rate sensor element, which measures a flow rate of air flowing through the bypass flow channel; and
a physical quantity sensor assy that incorporates a physical quantity sensor element, which measures a physical quantity of air flowing through the main flow channel, wherein:
the housing includes:
a first mount part on which the flow rate sensor assy is mounted; and
a second mount part on which the physical quantity sensor assy is mounted;
the flow rate sensor assy and the physical quantity sensor assy are attached to the housing from the same direction to be mounted on the first mount part and the second mount part respectively;
the first mount part includes:
a first sensor mount room having a bottom surface; and
a first sensor insertion hole opening on the bottom surface of the first sensor mount room and communicating with the bypass flow channel;
the second mount part includes:
a second sensor mount room having a bottom surface; and
a second sensor insertion hole opening on the bottom surface of the second sensor mount room and communicating with the main flow channel;
the flow rate sensor assy includes:
a flow rate sensor chassis part, a terminal being taken out from one end side of the flow rate sensor chassis part; and
a flow rate sensor support part provided on the other end side of the flow rate sensor chassis part to hold the flow rate sensor element;
the flow rate sensor assy is mounted on the first mount part in a state where the flow rate sensor chassis part is disposed in the first sensor mount room and the flow rate sensor support part is inserted in the first sensor insertion hole;
the physical quantity sensor assy includes:
a physical quantity sensor chassis part, a terminal being taken out from one end side of the physical quantity sensor chassis part; and
a physical quantity sensor support part provided on the other end side of the physical quantity sensor chassis part to hold the physical quantity sensor element;
the physical quantity sensor assy is mounted on the second mount part in a state where the physical quantity sensor chassis part is disposed in the second sensor mount room and the physical quantity sensor support part is inserted in the second sensor insertion hole;

an outer shape size of the flow rate sensor chassis part of the flow rate sensor assy is larger than a hole diameter of the first sensor insertion hole;

the flow rate sensor assy includes a step at a boundary between the flow rate sensor chassis part and the flow rate sensor support part;

the flow rate sensor chassis part is disposed in the first sensor mount room in a state where the step is in contact with a periphery of an opening of the first sensor insertion hole, which opens on the bottom surface of the first sensor mount room;

an outer shape side of the physical quantity sensor chassis part of the physical quantity sensor assy is larger than a hole diameter of the second sensor insertion hole;

the physical quantity sensor assy includes a step at a boundary between the physical quantity sensor chassis part and the physical quantity sensor support part;

the physical quantity sensor chassis part is disposed in the second sensor mount room in a state where the step is in contact with a periphery of an opening of the second sensor insertion hole, which opens on the bottom surface of the second sensor mount room;

the air flow rate measurement device further comprises;

a first seal material that is disposed on the bottom surface of the first sensor mount room to cover an outer periphery of the flow rate sensor chassis part, wherein the first seal material airtightly seals a gap between the first sensor mount room and the first sensor insertion hole; and a second seal material that is disposed on the bottom surface of the second sensor mount room to cover an outer periphery of the physical quantity sensor chassis part, wherein the second seal material airtightly seals a gap between the second sensor mount room and the second sensor insertion hole;

the first mount part and the second mount part are formed such that the first sensor mount room and the second sensor mount room are configured as a single sensor mount room without having a boundary therebetween; and the first seal material and the second seal material are partially shared.

2. The air flow rate measurement device according to claim 1, wherein:

the physical quantity sensor assy includes a pressure sensor element that measures a pressure of air as the physical quantity sensor element; and the pressure sensor element is disposed inward of the second sensor insertion hole.

3. The air flow rate measurement device according to claim 1, wherein one of the flow rate sensor assy and the physical quantity sensor assy includes a signal processing circuit that produces a multiple signal that is obtained by digitally converting and multiplexing an output of the flow rate sensor element and an output of the physical quantity sensor element, and outputs the multiple signal produced by the signal processing circuit to outside through one output terminal.

* * * * *